United States Patent [19]

Huang

[11] Patent Number: 5,945,654
[45] Date of Patent: Aug. 31, 1999

[54] CARD READER WITH DUAL-HEADED CARD SLOT

[75] Inventor: Hsin-Bo Huang, Taipei, Taiwan

[73] Assignee: Fametech Inc., Taipei, Taiwan

[21] Appl. No.: 09/014,599

[22] Filed: Jan. 28, 1998

[51] Int. Cl.$^6$ .................................................. G06K 13/06
[52] U.S. Cl. .......................................... 235/449; 235/493
[58] Field of Search ..................................... 235/449, 493

[56] References Cited

U.S. PATENT DOCUMENTS 5,362,952  11/1994  Nair et al. ................................ 235/449

*Primary Examiner*—Harold I. Pitts
*Attorney, Agent, or Firm*—Smith, Gambrell & Russell, LLP; Beveridge, DeGrandi, Weilacher & Young Intellectual Property Group

[57] ABSTRACT

A card reader with dual-headed card slot, comprising a main unit, two magnetic heads, a circuit board and a power cord. Near the center part of the main unit are two side walls forming a card slot, on each of the two side walls is an opening and a magnetic head fixing unit. The two magnetic heads are respectively fixed on two spring plates. The spring plates are then fixed to the magnetic head fixing unit on the main unit, so that the front end of the magnetic head is extending through the opening of the main unit to the inside of the card slot; the circuit board is fixed on the outside of one side wall of the main unit, and on a position of which corresponding to the magnetic head is an opening, the opening serves as the space to the extending and retracting movement of the magnetic head during the card reading process, so that the magnetic head will not be jammed, and on the circuit board is a power cord socket, into the power cord socket is inserted a power cord. By such a structure, since one magnetic head is equipped at each side of the card reading slot, the user will feel free to insert either side of a magnetic card through the card slot for the reading process, thus it will be much more convenient to the user who will be able to save the trouble of having to identify which is the effective reading side.

1 Claim, 4 Drawing Sheets ature, that is, the user will not have to identify the side with the magnetic stripe, all he has to do is insert the magnetic card through the card reader to complete the card reading process.

CARD READER WITH DUAL-HEADED CARD SLOT

BACKGROUND OF THE INVENTION

The present invention relate to a card reader with dual-headed card slot, particularly to one that the user will not have to identify which side bears the magnetic strip to face it to the magnetic head in the card reader, that is, the user will not have to identify the side with the magnetic stripe, all he has to do is insert the magnetic card through the card reader to complete the card reading process.

Conventionally, a regular card reader comprises a main unit, a circuit board and a magnetic head, wherein on the main unit is a card reading slot that serves as the channel for the insertion of a magnetic card, the circuit board is fixed on the side of the main unit, on said circuit board is a power cord socket, in said power cord socket is inserted a power cord, and on the side wall of said main unit is an opening, while the magnetic head is fixed by a spring plate to the opening of the main unit, and the front end of the magnetic head is protruding out of the card reading slot, and is connected with an electric cable to the circuit board; in the reading process in the above structure, the magnetic card is inserted through the card reading slot, so the magnetic head will read the data on the magnetic stripe to complete the card reading operation.

In the above conventional type of card reader, however, there is only one magnetic head serving to read the magnetic stripe on the magnetic card, and it is located on one side wall of the main unit, so before the user tries to insert the card for reading purpose, he has to make sure to face the side with the magnetic stripe on the magnetic card to the position of the magnetic head, to avoid the magnetic head from reading the side without the magnetic stripe, which will result in failure of reading operation, so the user has to reverse the magnetic card side and repeat the card inserting operation; such a conventional type of card reader will cause inconveniences to the user, such as, the user will have to identify the correct direction of the magnetic card to pass the card reading slot, in order to satisfactorily complete his card reading operation, or he has to repeat another card reading operation in case the direction of the magnetic card is mistaken (i.e. the side of magnetic card with the magnetic stripe is backing the magnetic head), therefore, the user will find it inconvenient to use a conventional type of card reading machine.

In view of the above shortcomings, the subject inventor has spent a long period of time in the research and innovation, and has finally developed and designed a card reader with dual-headed card slot of the present invention.

SUMMARY OF THE INVENTION

The primary objective of the present invention is to provide a card reader with dual-headed card slot, wherein, the user will not have to identify which side bears the magnetic stripe in order to face it to the magnetic head in the card reader, that is, the user will not have to identify the direction of the magnetic card; all he has to do is insert the magnetic card into the card reading slot to complete the card reading operation.

To achieve the above objective, the present invention comprises a main unit, two magnetic heads, a circuit board and a power cord, wherein: near the center part of the main unit are two side walls that form a card reading slot, on each of the two side walls is an opening and a magnetic head fixing unit; the two magnetic heads are respectively fixed on two spring plates, said spring plates are then fixed onto the magnetic head fixing unit on said main unit, so the front ends of the two magnetic heads are extending through the openings on the side walls of the main unit to the inside of the card reading slot, and said two magnetic heads are in parallel connection with the circuit board, so that either one magnetic head will transmit any signals, upon detection, to the circuit board for processing, the processed data are then transmitted to the computer or other electronic appliances for data processing; the circuit board is fixed on the outside of one side wall on the main unit, on a position of which corresponding to the magnetic head is an opening, so that the magnetic head will have a flexible space and will not be jammed in its reading process, and on the circuit board is a power cord socket. Into the power cord socket is inserted a power cord.

BRIEF DESCRIPTION OF DRAWINGS

To enable further understanding of the integral configuration, installation, characteristics and performances of the present invention, the embodiment of the present invention is described in details accompanied by drawings, in which.

Figure 1:
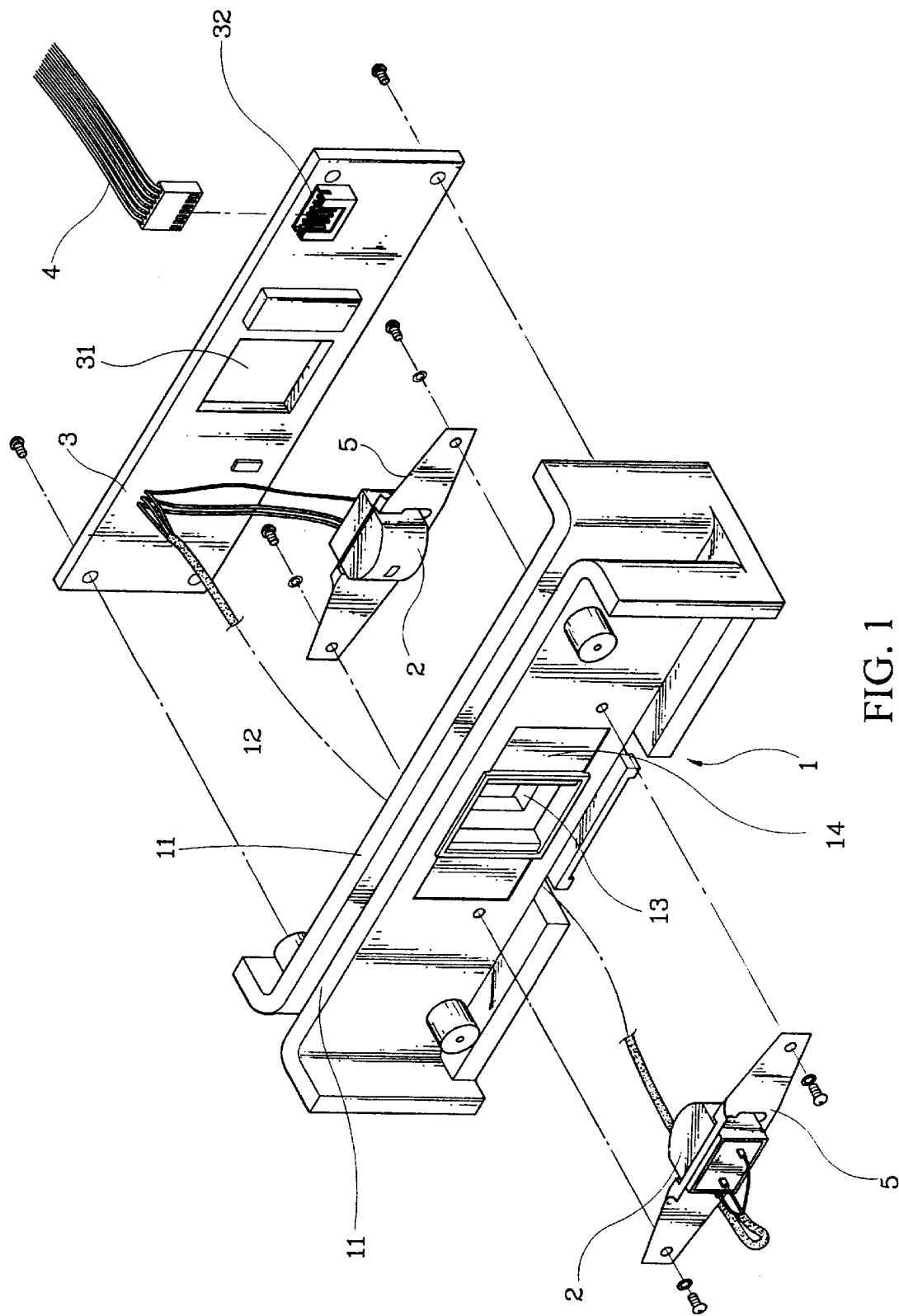
FIG. 1 is an exploded view of the present invention.

BRIEF DESCRIPTION OF NUMERALS 1 main unit 11 sidewall
12 inserting slot
13 opening
14 head fixing unit
15 magnetic head
16 circuit board 31 opening
17 power cord socket
18 power cord
19 spring plate

DETAILED DESCRIPTION OF PREFERRED EMBODIMENT

Referring to FIGS. 1 to 4, the card reader with dual-headed card slot of the present invention comprises a main unit 1, two magnetic heads 2, a circuit board 3 and a power cord 4, wherein, near the center part of the main unit 1 are two side walls 11 to form a card slot 12, on each of said two side walls 11 is an opening 13 and a magnetic head fixing unit 14; the two magnetic heads 2 are respectively fixed on two spring plates 5, said two spring plates 5 are then fixed onto the head fixing unit 14 on said main unit 1, so positioned that the front end of the magnetic head 2 is extending through the opening 13 on the side wall 11 of the main unit 1 to within the card slot 12, and said two magnetic heads 2 are in parallel connection with the circuit board 3, so that any signs detected by either one of the two magnetic heads 2 will be transmitted to the circuit board 3 for treatment, the treated signals will then be transmitted to the computer or other electronic appliances for data processing; the circuit board 3 is fixed on the outside of one side wall of the main unit 1, on a position of which corresponding to the magnetic head 2 is an opening 31, said opening 31 serves as the space to accommodate the extending and retracting movement of the magnetic head 2 when a card is being read, so that the magnetic head 2 will not be jammed, and on said circuit board 3 is a power cord socket 32, into said power cord socket 32 is plugged a power cord 4.

When said structure is in application, since there is a magnetic head 2 on each side of the card slot 12, the user may insert either side of his magnetic card through the card slot 12 for the reading process, thus, saving the trouble to confirm the correct side of a card to insert in a conventional unit for the reading purpose, so the user may find it much more convenient.

As mentioned above, when a user is using the magnetic card, he will not have to identify on which side is the magnetic strip and face that side to the magnetic head 2 in the card reader, in other words, the user will not have to locate the side with the magnetic stripe, all he has to do is insert the card through the card slot 12 to complete the card reading process; therefore, it is more convenient than a conventional type to the user who will be able to save the trouble of identifying the correct direction to be inserted in the card reader 12.

Figure 2:
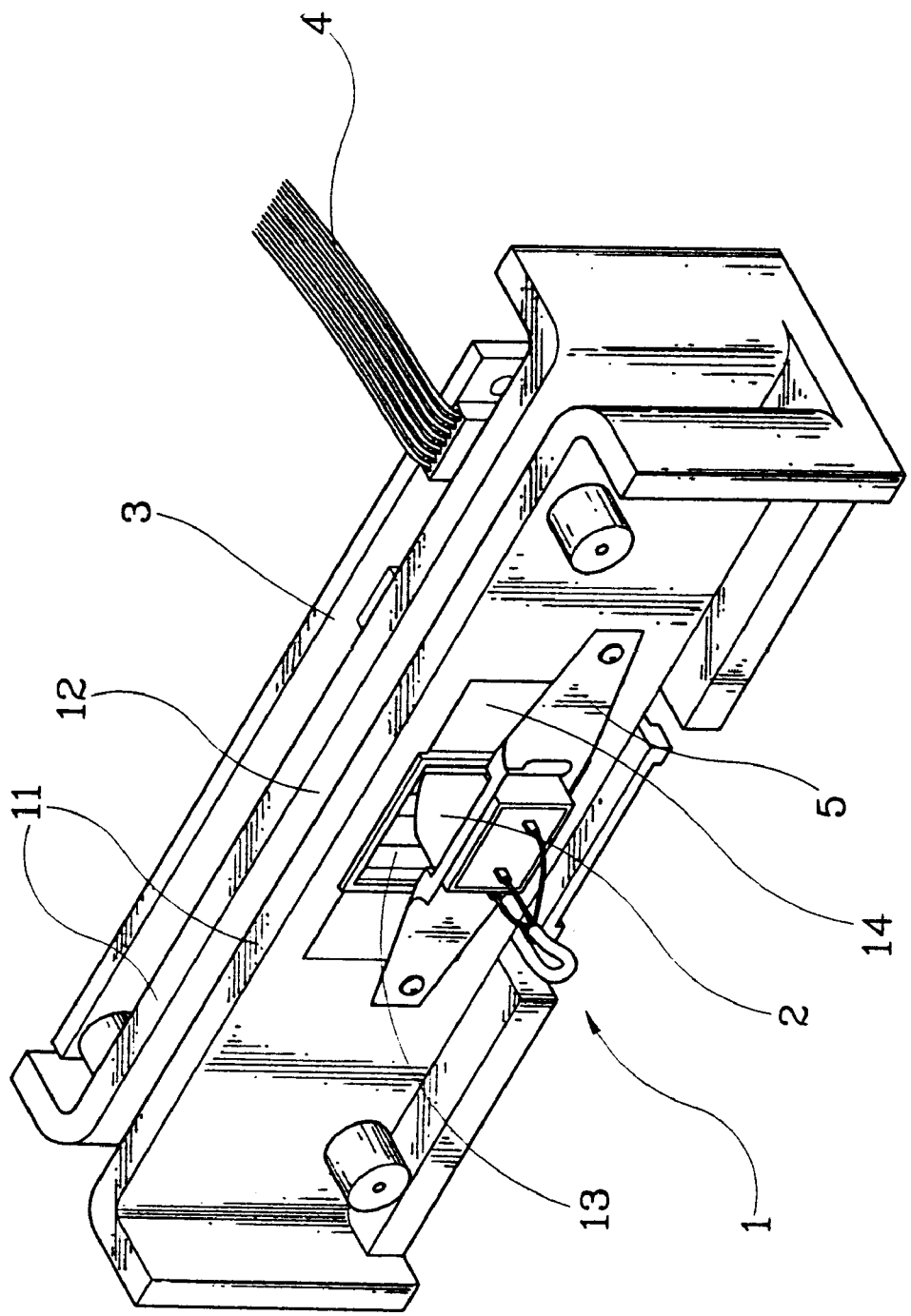
FIG. 2 is a perspective assembled view of the present invention.
Figure 3:
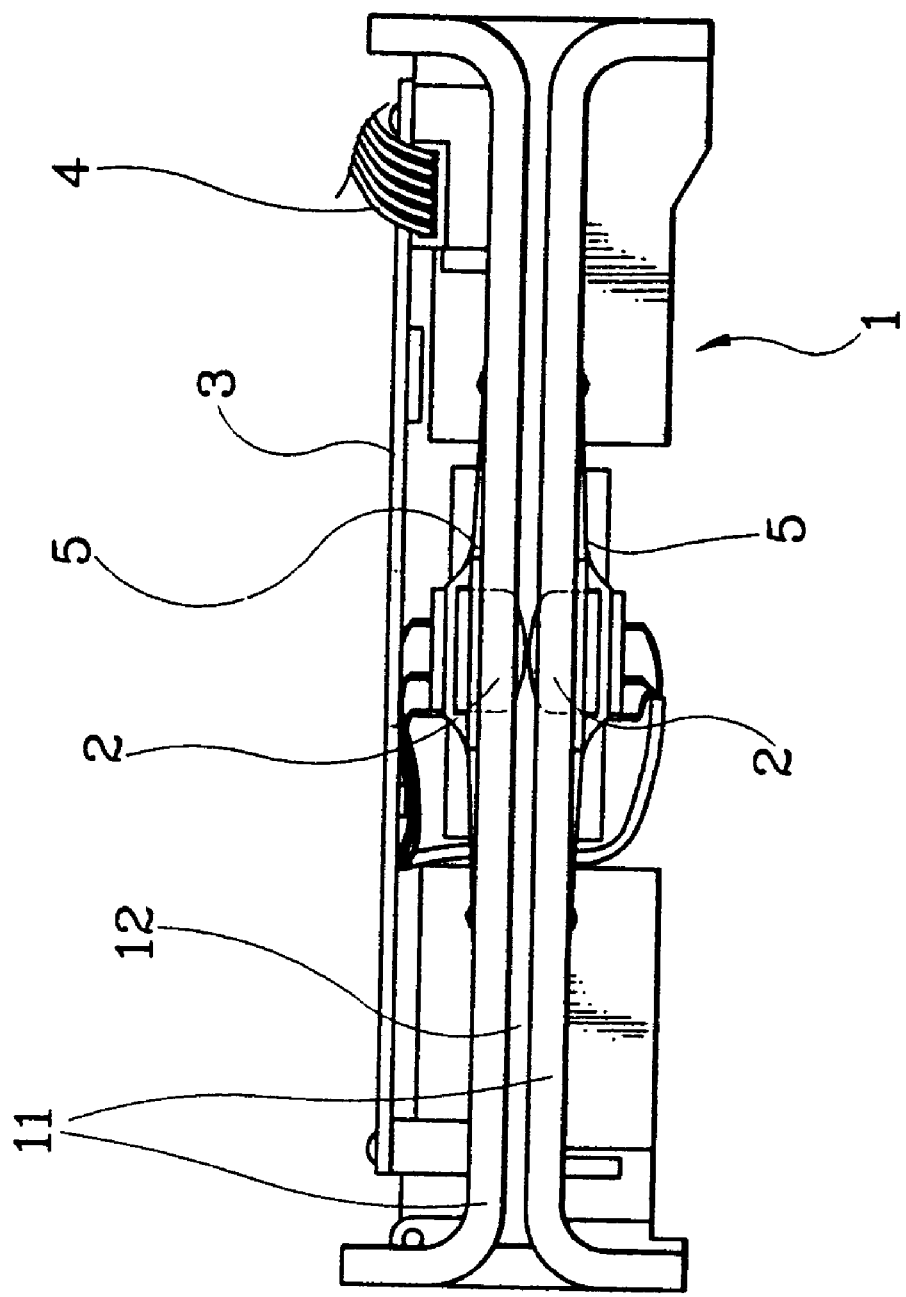
FIG. 3 is a top view of an embodiment of the present invention.
Figure 4:
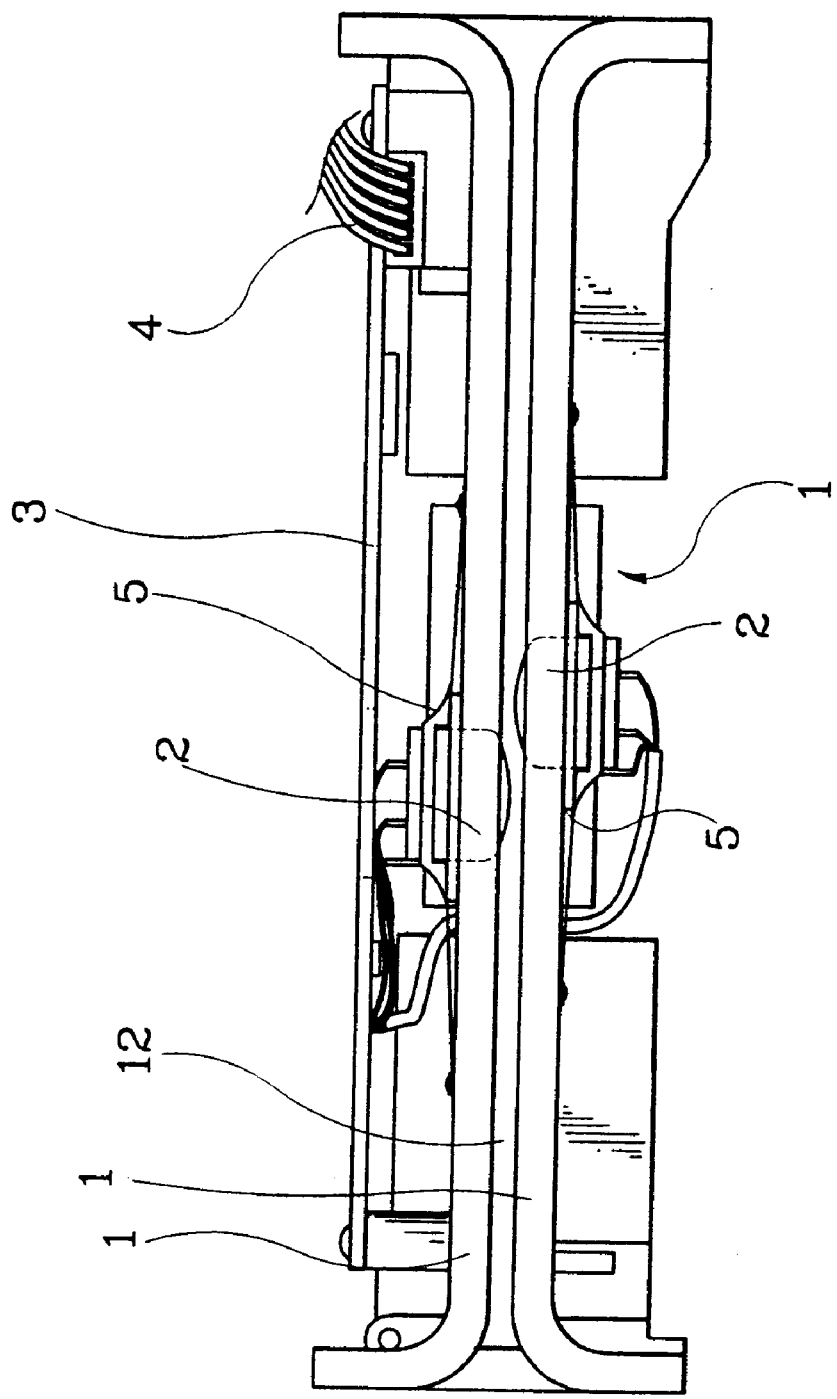
FIG. 4 is a top view of another embodiment of the present invention.

Referring to FIG. 2 which illustrates an example of embodiment, wherein the two magnetic heads 2 are opposite to each other, besides, referring to the example of embodiment illustrated in FIG. 4 wherein the positions of the two magnetic heads 2 are staggered.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A card reader with dual-headed card slot, comprising:

a main unit, near its center part being two side walls to form a card reading slot, and on each of said two side walls being an opening and a magnetic head fixing unit;

two magnetic heads, being fixed respectively on two spring plates, said spring plates being fixed on said magnetic head fixing unit on said main unit, so the front end of said magnetic head being extending through said opening on said side wall of said main unit and protruding to within said card reading slot, and said two magnetic heads being in parallel connection with the circuit board, so that either one magnetic head will transmit any signals, upon detection, to said circuit board for processing;

a circuit board, being fixed on the outside of one side wall of said main unit, on a position of which corresponding to said magnetic head being an opening, and on said circuit board being a power cord socket, said circuit board serves to receive the data signals detected by said magnetic heads and process them into data signals that can be identified by the computer or other electronic appliances;

a power cord, with a plug to connect to the power cord socket on said circuit board.

* * * * *